Feb. 20, 1962 F. J. HOOVEN 3,021,721
VEHICLE STEERING MECHANISM
Filed Aug. 7, 1957 2 Sheets-Sheet 1
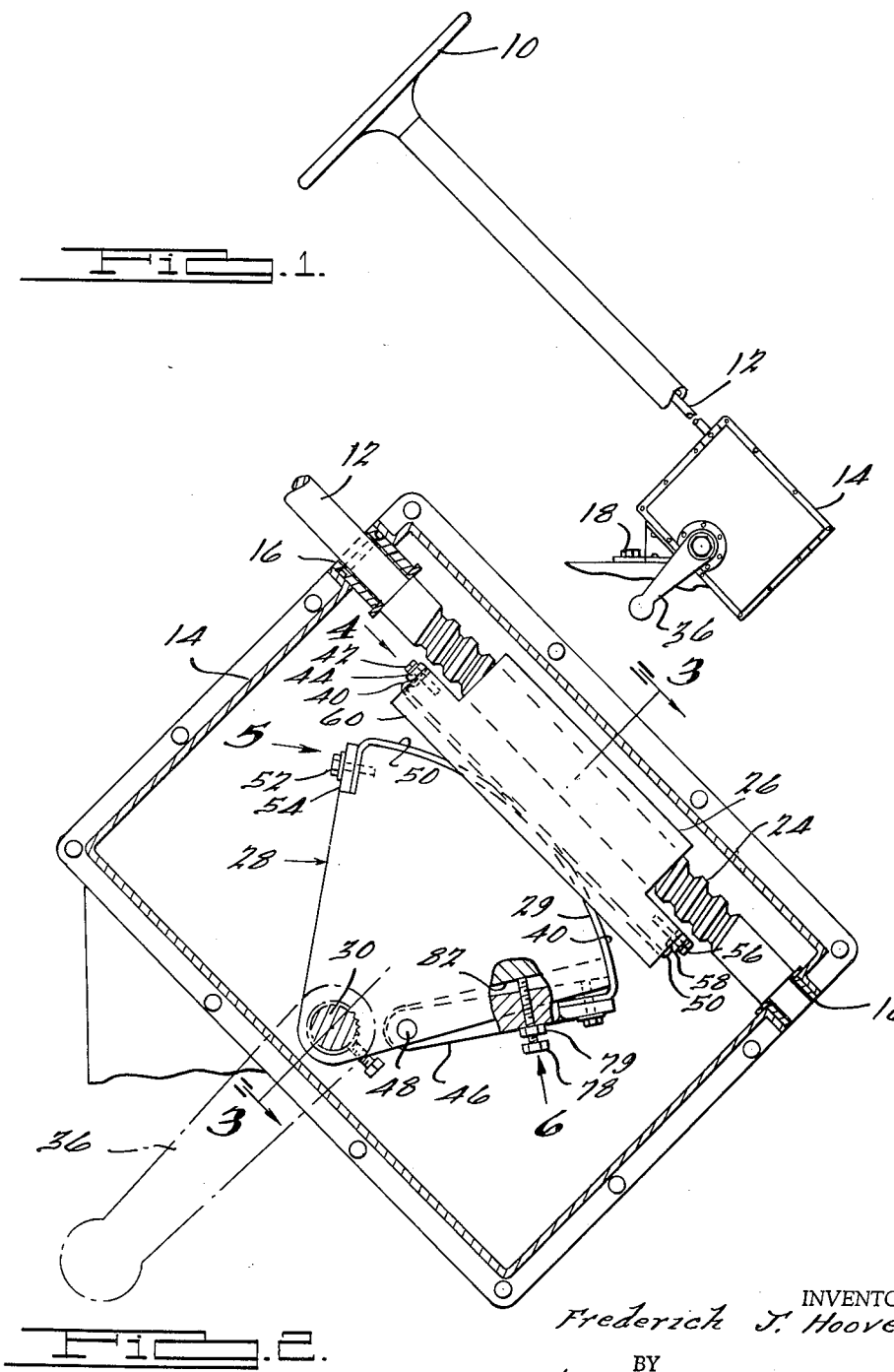
INVENTOR.
Frederick J. Hooven.
BY
Harness, Dickey & Pierce
ATTORNEYS

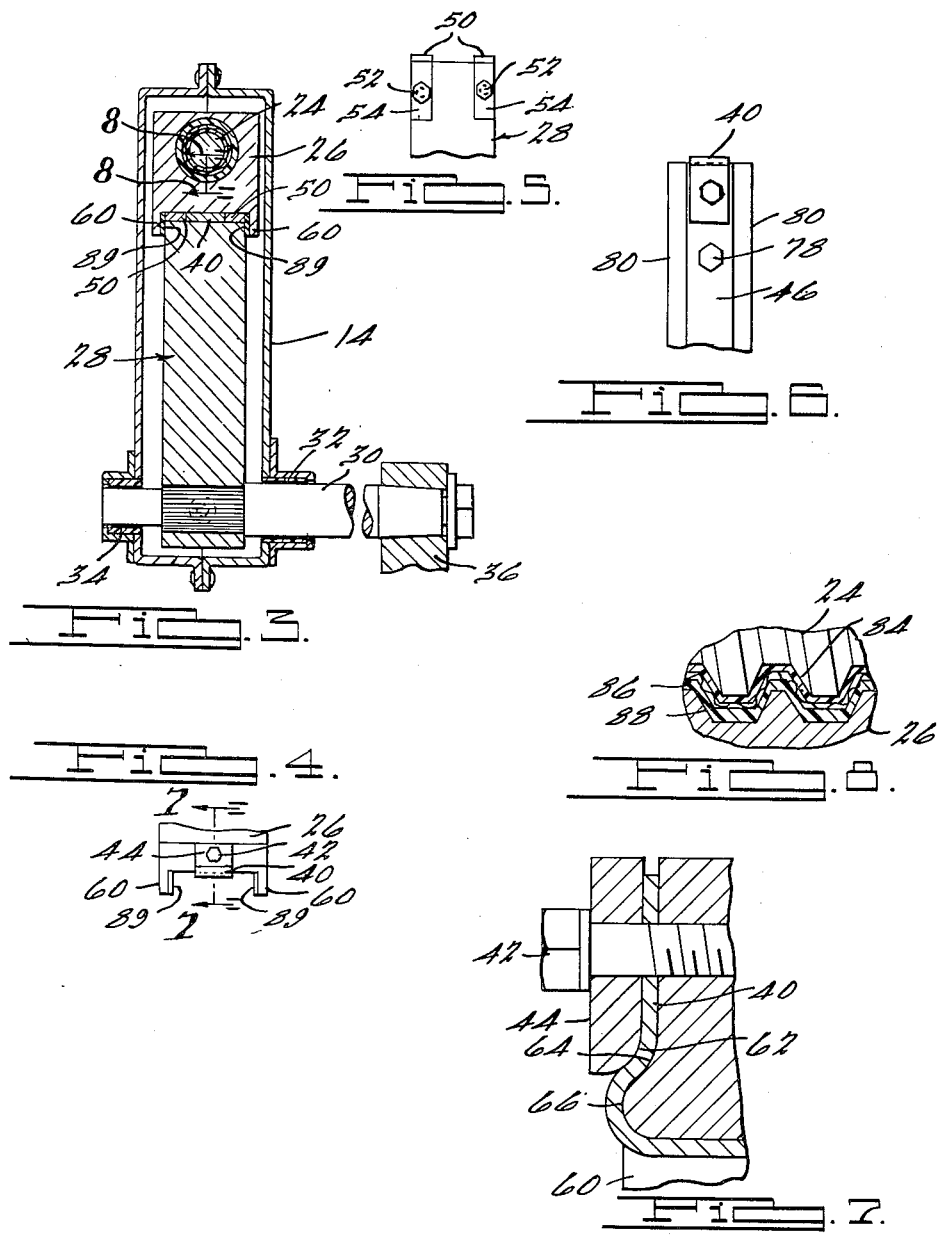

United States Patent Office 3,021,721
Patented Feb. 20, 1962

3,021,721
VEHICLE STEERING MECHANISM
Frederick J. Hooven, Bloomfield Hills, Mich., assignor to American Metal Products Company, Detroit, Mich., a corporation of Michigan
Filed Aug. 7, 1957, Ser. No. 676,825
3 Claims. (Cl. 74—496)

This invention relates to steering mechanisms for automotive vehicles, and more particularly to a steering mechanism which requires no lubrication and from which all play has been eliminated.

In many steering mechanisms employed in automotive vehicles today, the steering column has a worm gear on one end which engages the teeth of a sector gear to pivot the sector back and forth in response to the rotation of the steering column. An arm extending from the sector gear pivots with it and is connected to the steering linkage to turn the wheels of the vehicle. Under this arrangement, a considerable amount of undesirable play is present between the teeth of the gear sector and the worm gear and frequent lubrication is required.

This invention overcomes the play and lubrication problems by providing a sector member which is adapted to be pivoted by a traveling nut mounted on a spiral thread in the end of the steering column. A plurality of steel bands connect the traveling nut to the sector, rather than the conventional gear teeth for accomplishing the driving relation which pivots the sector by transmitting an appropriate pulling force when the traveling nut moves in either direction. Thus, the band arrangement provides a positive drive between the traveling nut and the sector member which can be adjusted to eliminate play initially and thereafter as no wear can develop between the functional parts. A molded backing having a bearing surface of low friction material which does not require lubrication is provided between the traveling nut and the spiral thread and conforms perfectly to the spiral thread to prevent play therebetween.

It is one object of the invention to provide a driving connection for the steering mechanism of a vehicle which can be adjusted to eliminate play between the moving parts thereof.

It is another object of the invention to provide a driving connection for the steering mechanism of a vehicle in which no wear occurs between the movable parts thereof.

It is a further object of the invention to provide a steering mechanism for a vehicle which requires no lubrication.

Other objects and features of novelty of the invention will become apparent when referring, for a better understanding of the invention, to the following description taken in conjunction with the accompanying drawings, wherein:

FIGURE 1 is a side view of a steering mechanism embodying features of the invention;

FIG. 2 is an enlarged sectional view of the steering mechanism housing illustrated in FIG. 1;

FIG. 3 is a sectional view of the steering mechanism illustrated in FIG. 2, taken along the line 3—3 thereof;

FIG. 4 is an end view of the portion of the structure illustrated in FIG. 2, indicated by the arrow 4;

FIG. 5 is a view of the portion of the structure illustrated in FIG. 2, indicated by the arrow 5;

FIG. 6 is a view of the portion of the structure illustrated in FIG. 2, indicated by the arrow 6 in FIG. 2;

FIG. 7 is an enlarged broken sectional view of the end of the traveling nut illustrated in FIG. 4, taken along the line 7—7 thereof; and FIG. 8 is an enlarged broken sectional view of the structure illustrated in FIG. 3, taken along the line 8—8 thereof.

Referring to FIGS. 1 to 6, a steering wheel 10 is connected to a driving shaft 12 which is supported in a housing 14 by means of bearings 16 disposed in opposite end walls of the housing 14. The housing 14 is in turn mounted on the frame of an automobile by bolts 18.

The portion of the driving shaft 12 intermediate the bearings 16 has a spiral thread 24 formed thereon and an elongated traveling nut 26 is cooperatively mounted on the spiral thread 24 so that it will reciprocate back and forth in response to the direction of rotation of the spiral thread 24. A sector member 28 is pivotally mounted within the housing 14 by means of a shaft 30 and bearing elements 32 and 34. One end of the shaft 30 extends outside the housing 14 and has a pitman arm 36 keyed thereto so that it will pivot with the sector member 28.

A relatively wide steel band 40 is fastened to one end of the traveling nut 26 by means of a bolt 42 and a pressure plate 44 and passes between the traveling nut and the sector member 28 and is fastened to the upper end of an arm 46 pivoted to the sector 28 by a pin 48. Similarly two spaced-apart steel bands 50 are fastened to the other end of the sector 28 by a pair of bolts 52 and a pair of pressure plates 54, pass between the sector 28 and the traveling nut 26 and are fastened to the other end of the traveling nut by a pair of nuts 56 and pressure plates 58. FIG. 3 most clearly illustrates the position of the bands 40 and 50 relative to the sector 28. It will also be observed that the traveling nut 26 has two downwardly projecting guides 60 on either side thereof to prevent the bands from slipping out of alignment.

Referring to FIGS. 4 and 7, one method for securely attaching the ends of the bands is illustrated. It will be observed that the pressure plate 44 has a curved corner 62 which cooperates with a correspondingly curved portion 64 to firmly grip the band 40 in an offset manner so that it cannot slip out. It will also be observed that the traveling nut 26 has a rounded corner 66 to relieve the stress in the band 40 at the corner.

Referring to FIGS. 2 and 6, the pivoted arm 46 is shown which provides a means for adjusting the position of the sector 28 relative to the traveling nut 26 to insure that the bands 40 and 50 are taut so as to eliminate backlash. It will be observed that the arm 46 is disposed within a recess defined by two parallel wall portions 80 and an internal wall 82, and pivots upon the pin 48 which passes between the wall portions 80. A bolt 78 having a locking nut 79 passes through an internally threaded aperture in the arm 46 and abuts against the internal wall 82. By turning the bolt 78 the arm 46 can be pivoted outwardly away from the sector 28 to tension the bands so as to eliminate any backlash.

In operation when the steering wheel 10 is turned in a clockwise direction when viewed from the driver's position, the spiral thread 24 is rotated therewith and moves the traveling nut 26 upwardly to the left in FIG. 2. This causes the band 40 to pull on the upper end of the arm 46 to pivot the sector 28 in a counterclockwise direction as viewed in FIG. 2 which in turn pivots the arm 36. When the steering gear 10 is turned in a counterclockwise direction when viewed from the driver's position, the traveling nut moves downwardly to the right as viewed in FIG. 2 and causes the bands 50 to pivot the sector 28 in a clockwise direction. Thus the desired motion is transmitted to the sector 28 by means of the steel bands 40 and 50 with the consequent elimination of the conventional gear teeth and their troublesome backlsh.

Referring to FIG. 2, it will be observed that the sector member 28 has an arcuate outer edge 29 and that the underside of the traveling nut 26 is substantially tangential to the edge. The pivot point of the sector member 28 is disposed at the center of curvature of the arcuate edge 29 which has a radius of curvature of approximately six inches. It will also be observed that the length of the traveling nut 26 is such that the ends thereof are spaced apart relatively the same distance as the ends of the arcuate edge 29. This arrangement of the relative sizes and positions of the traveling nut and sector member provides the required mechanical advantage and is also sufficiently compact to meet existing space limitations.

It will be observed in FIG. 2 that as the traveling nut 26 reciprocates, the portions of the steel bands 40 and 50 which are not in contact with the arcuate edge 29 will always be disposed along the underside of the traveling nut. This means that the force transmitted by the steel bands is equal and opposite to the force applied to the traveling nut and that the line of action of the force is always substantially tangential to the arcuate edge 29 and does not change its position as the sector member 28 pivots.

In order to eliminate the necessity for lubricating the traveling nut 26 so that it can move freely relative to the spiral thread 24, a low friction bearing element is provided as illustrated in FIG. 8 which can be a low friction resin bearing or a Teflon bearing element. By way of example only, a Teflon bearing element for such an application is completely described in copending application Serial No. 619,782, filed November 1, 1956, and now abandoned, by Charles S. White and briefly comprises a woven fabric material 84 having Teflon threads forming the bearing face and cords of bonding material on the opposite face thereof. A thin layer 86 of woven material, which may be glass or a resinous material of the inorganic type, is bonded to said opposite surface of the layer 84 by suitable bondable material. A layer of hardenable material 88 is then forced under pressure into the space between the threads of the traveling nut 26 and the layer 86 to force the Teflon layer 84 against the spiral thread 24 so that it is intimately molded against the threads so as to conform substantially perfectly thereto. It is apparent that the intimate contact achieved in this manner cannot be obtained by machined threads. When the material 88 hardens, a superior bearing having no backlash is consequently formed between the traveling nut 26 and the spiral thread 24 which does not require lubrication because of the characteristics of the Teflon material which forms the bearing surface.

The bearings 16, 32 and 34 may be composed of Teflon sleeves, as described and claimed in the aforesaid copending application of Charles S. White, to eliminate the need for lubrication at these points. Also, referring to FIG. 3, the inside surfaces of the guides 60 may be lined with strips 89 of Teflon material to provide self-lubricating bearing surfaces which eliminate friction between the guides 60 and the top of the sector 28. It will be observed that guides 60 also help to prevent rotation between the traveling nut 26 and the sector member 28.

What is claimed is:
1. In a steering mechanism, a housing, a shaft journaled in said housing having a helical thread thereon, a traveling nut having an aperture containing a helical thread, said threads being in mating position to prevent endwise separation without rotation but in spaced relation due to the relative widths of the threads and grooves, a low friction layer having one face slidably engaging one of said threads, a backing material engaging the other face of said layer and said other thread and filling the space therebetween, a pivot mounted on said housing having a sector, and crossed flexible means connecting opposite ends of said sector to opposite ends of said nut.

2. In a steering mechanism, a housing, a shaft journaled in said housing having a helical thread thereon, a traveling nut having an aperture containing a helical thread, said threads being in mating position to prevent endwise separation without rotation but in spaced relation due to the relative widths of the threads and grooves, a low friction layer having one face slidably engaging one of said threads, a backing material engaging the other face of said layer and said other thread and filling the space therebetween, a pivot mounted on said housing having a sector, crossed flexible means connecting opposite ends of said sector to opposite ends of said nut, and means for tightening said flexible means to eliminate play between the sector and nut.

3. A cylindrical element containing a peripheral thread, a nut having an aperture containing a thread disposed on the thread of said element, the threads being so dimensioned as to have a space therebetween but interrelated diametrically to prevent endwise separation without rotation, a layer of low friction material having its front face engaging one of the threads in slidable surface engagement therewith, a backing material engaging said other thread and the rear face of said low friction layer when filling the space therebetween, a housing, means pivotally mounting said cylindrical element in said housing, a sector in said housing, and crossed flexible means connecting opposite ends of said nut to opposite ends of said sector.

References Cited in the file of this patent
UNITED STATES PATENTS

| 1,387,825 | Aldeborgh | Aug. 16, 1921 |
| 1,405,852 | Maag et al. | Feb. 7, 1922 |
| 1,937,470 | Davis | Nov. 28, 1933 |
| 2,058,841 | Thomson | Oct. 27, 1936 |
| 2,233,248 | Douglas | Feb. 25, 1941 |
| 2,686,342 | D'Deustachio | Aug. 17, 1954 |
| 2,779,206 | Doerfner | Jan. 29, 1957 |
| 2,823,724 | Gill | Feb. 18, 1958 |

FOREIGN PATENTS

| 37,641 | Norway | Aug. 13, 1923 |
| 1,078,061 | France | Nov. 15, 1954 |

OTHER REFERENCES

Polymer Corp. Machine Design, p. 156, March 1954. (Copy in Div. 12.)

Fabricated Nylon Parts, March 1954, Machine Design, pp. 153–159. (Copy in Div. 12.)

Du Pont S.A.E. Journal, pp. 104, 106, September 1956. (Copy in Div. 12.)

Fasteners Magazine, vol. 9 #2, page 10, Fig. 6, published by Fasteners, Cleveland, Ohio. (Copy in Div. 57.)